United States Patent [19]
Wolf et al.

[11] Patent Number: 4,900,161
[45] Date of Patent: Feb. 13, 1990

[54] SYSTEM FOR MEASURING TEMPERATURE OF A FILLED VESSEL ON A HOT PLATE

[75] Inventors: Kurt Wolf; Wolfram Andre, both of Wildbad, Fed. Rep. of Germany

[73] Assignee: Fissler GmbH, Idar-Oberstein, Fed. Rep. of Germany

[21] Appl. No.: 128,682

[22] Filed: Dec. 4, 1987

[30] Foreign Application Priority Data

Dec. 10, 1986 [DE] Fed. Rep. of Germany ....... 3642182

[51] Int. Cl.$^4$ .............................................. G01J 5/00
[52] U.S. Cl. .................................... 374/123; 374/124; 356/43; 356/45
[58] Field of Search ............... 374/123, 124, 126, 127, 374/128; 356/43, 45

[56] References Cited

U.S. PATENT DOCUMENTS

| | | | |
|---|---|---|---|
| 2,074,641 | 3/1937 | Clark | 356/43 |
| 3,352,156 | 11/1967 | Beitz | 374/123 |
| 3,635,088 | 1/1972 | Poncet | 356/45 X |
| 4,020,695 | 5/1977 | Roney | 374/127 |
| 4,191,876 | 4/1980 | Ohkubo et al. | 374/124 |
| 4,326,798 | 4/1982 | Kahn | 356/43 |
| 4,525,066 | 6/1985 | Guillaume et al. | 356/43 |
| 4,566,808 | 1/1986 | Pompei et al. | 374/124 |
| 4,659,234 | 4/1987 | Brouwer et al. | 374/126 X |

FOREIGN PATENT DOCUMENTS

| | | |
|---|---|---|
| 3341234 | 5/1985 | Fed. Rep. of Germany . |
| 3538353 | 4/1986 | Fed. Rep. of Germany . |
| 0023226 | 2/1984 | Japan ................................... 356/43 |

Primary Examiner—Stephen Marcus
Assistant Examiner—Christine A. Peterson

[57] ABSTRACT

The invention involves a method for measuring the temperature in a heating system of the type having an electrically heated hot plate with a filled cooking vessel on it and a radiation pick-up located at varying distances from the side of the vessel and pointed at it which emits a signal indicating the temperature of the substance in the vessel based upon radiation from an area on the side of the vessel as detected by the radiation measurement field of the radiation pick-up, the radiation intensity of which decreases as a square of increasing distance. To compensate for the effect on measurements of spurious radiation form the changing position of the vessel on the hot plate, the invention involves adjusting the angle of a non-intersecting radiation measurement field to obtain corresponding reduction in the area of radiation detetion on the vesel for increasing distances between vessel and radiation pick-up.

8 Claims, 2 Drawing Sheets

FIG.2

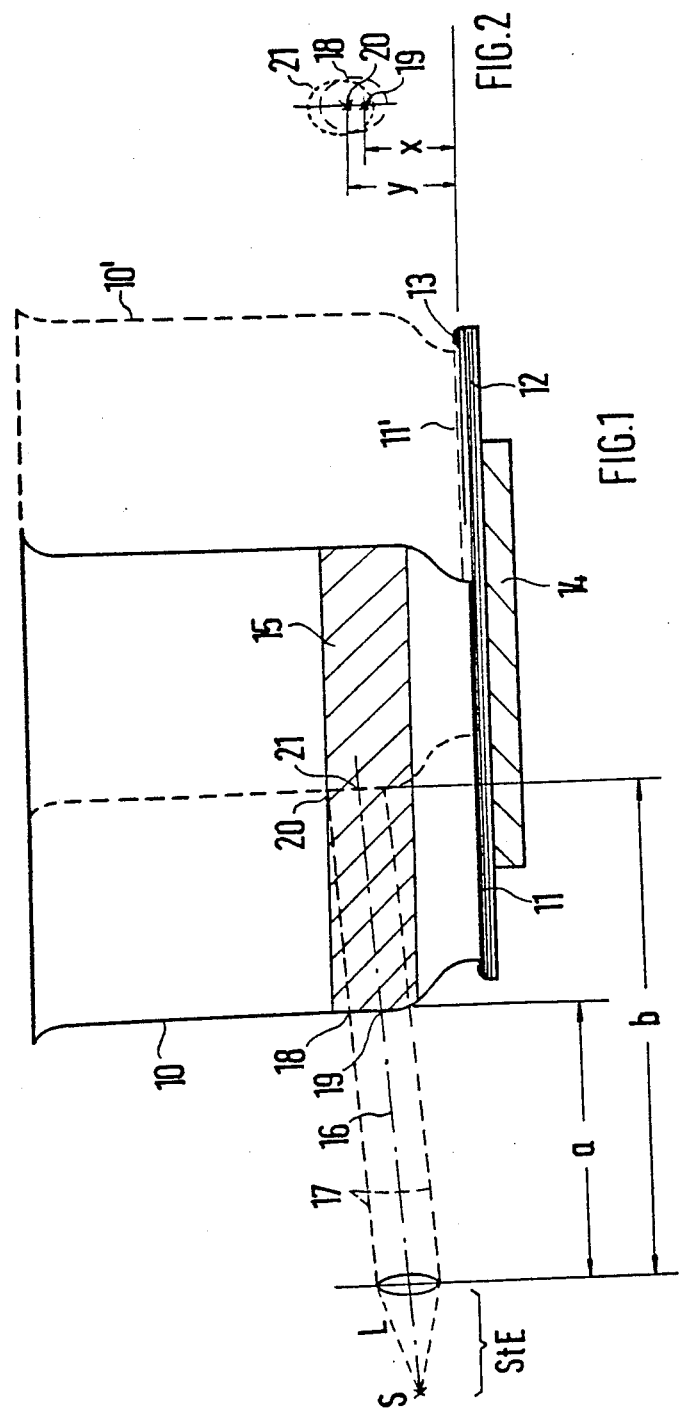

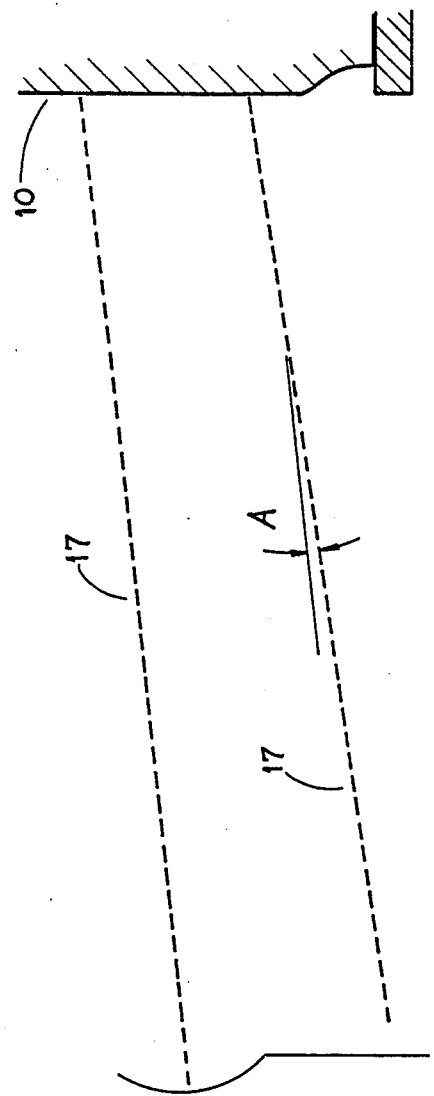

SYSTEM FOR MEASURING TEMPERATURE OF A FILLED VESSEL ON A HOT PLATE

FIELD OF THE INVENTION

The invention is related generally to systems for measuring the temperature in a heating system including an electrically heated hot plate and a cooking vessel on it containing material to be heated. More particularly, it is related to apparatus of the type having a radiation pick-up positioned at varying distances from, and pointed at, the side of the vessel, the pick-up emitting a signal, depending on the temperature of the material in the vessel, based upon radiation from an area on the side of the vessel as detected by the radiation measurement field of the pick-up, the radiation intensity decreasing according to the square of the increasing distance.

BACKGROUND OF THE INVENTION

Apparatus of this general type is disclosed in German patent documents DE-AS-33 41 234 and DE-PA 35 38 353. In such apparatus, it is primarily during the heating-up phase that accuracy of measurement is most significantly influenced by changes in the distance of the pick-up from the side of the vessel. The position of the vessel on the hot plate can vary greatly, with the result that the detected surface is warmed more or less quickly.

Such measurement error during heating, caused by the position of the vessel, is compensated for by having the radiation measuring field point with its middle axis at an acute angle to the surface of the hot plate on which the vessel is placed. Such angled arrangement of the radiation pick-up has the result that, with increasing distance between vessel and pick-up, the center of the area of radiation detection moves farther and farther away from the bottom of the vessel. With decreasing distance, the center of the area of radiation detection shifts in a direction toward the bottom of the vessel.

This results in a compensation for the lag in temperature measurements during the heating-up phase by shifting the area of radiation detection closer to the center of the hot plate when the vessel is close to the pick up. If the vessel is moved away from the pick-up, then the faster increases of temperature readings during the heating-up phase, which would take place with a horizontally arranged radiation measurement field, are eliminated by relocation of the area of radiation detection into colder ranges of the side of the vessel, that is, farther away from the bottom of the vessel.

In this way, the measuring errors during the heating-up phase which result from the positioning of the vessel on the hot plate are automatically compensated for. The sensed temperature thus substantially corresponds to the actual temperature of the substance to be heated, regardless of the position of the vessel on the hot plate, that is, regardless of the distance from the pick-up. This is particularly important during the heating-up phase, during which the temperature changes continuously and the temperature level is set.

It has been observed that, in the steady state of such heating systems, the measurement of temperature by radiation sensing is affected in various ways by secondary radiation caused by the temperature of the hot plate itself. In such situations the hot place causes spurious radiation which is dependent upon the position of the cooking vessel on the hot plate. Since the detected radiation intensity decreases as a square of increasing distance, the measurement will be in error more or less, depending upon the share of spurious radiation reaching the pick-up.

OBJECTS OF THE INVENTION

It is the object of this invention to create a system of the type mentioned above in which the influence of the spurious radiation of the hot plate is compensated for at various positions of the cooking vessel on the hot plate, so that temperature is measured with sufficient accuracy regardless of the position of the cooking vessel on the hot plate.

SUMMARY OF THE INVENTION

The present invention addresses the above-mentioned problems in such a way that the amount of spurious radiation which is emitted from the hot plate and reaches the pick-up is compensated for by changing the angle of a non-intersecting radiation measurement field and thereby correspondingly reducing the area of radiation detection with increasing distance.

By adjusting the radiation angle of the radiation measurement field, the affect of the spurious radiation of the hot plate can be compensated for without having to use expensive radiation pick-ups for this purpose. For this purpose, this system considers in the simplest terms the emission factor of the hot plate. The entire heating system is included in the measuring system.

The degree of reduction of the area of radiation detection on the vessel determines the extent of compensation. The area of radiation detection can vary minimally or to a greater extent from the ideal square increase to balance the radiation intensity. In so doing, it has been seen to be sufficient to compensate for the spurious radiation which occurs when the distance between the pick-up and the side of the cooking vessel is at a maximum. Then, when the distance is reduced, the compensation remains sufficient. The pick-up, therefore, emits a signal corresponding to the temperature of the substance in the cooking vessel regardless of the position of the cooking vessel on the hot plate and the extent of the spurious radiation affecting the pick-up.

If, because of greater distance between the side of the vessel and the pick-up, the amount of spurious radiation exceeds the loss of radiation intensity which is caused by the increase in distance, then this invention calls for the radiation measurement field with an approximately round cross-section which is tapered, that is, expanding in a direction toward the radiation pick-up, at an angle of less than about 5 degrees.

If the angle of taper of the radiation measuring field is adjustable, then alignment can be carried out for the maximum distance between the side of the vessel and the radiation pick-up. For a radiation pick-up with input optics and a rear-mounted sensor, the angle of taper of the radiation measurement field can be changed by moving the sensor along the middle axis of the field.

Alignment of the apparatus for the smallest distance between the side of the vessel and the radiation pick-up can be carried out by having the radiation pick-up vertically adjustable with respect to the horizontal placement surface of the hot plate.

If the temperature of the substance in the cooking vessel is constant, the same signal is then received at the radiation pick-up, following proper alignment in accordance with this invention, throughout the entire distance range.

Another feature of this invention relates to getting adequate radiation to the radiation pick-up. To get adequate radiation, this invention provides an annular band around the outside of the vessel which has a high radiation emission factor. Such band extends in width at least beyond the range of the widest area of radiation detection. Such band ideally lies in the transition range between the bottom of the cooking vessel and its side. Such band has a uniform high emission factor of, for example, greater than 0.9.

BRIEF DESCRIPTION OF THE DRAWINGS

The invention is explained in greater detail by an example shown in the drawing, in which:

FIG. 1 is a schematic representation of the apparatus of this invention, including a radiation pick-up and cooking vessel positioned on a hot plate.

FIG. 2 is an illustration of the areas of radiation detection which vary according to the edge positions of the cooking vessel on the hot plate.

FIG. 3 is a schematic illustration of a taper in the angle of the radiation field measurement in that the solid line adjacent the letter "A" is parallel to dotted line 17 spaced thereabove.

DETAILED DESCRIPTION OF PREFERRED EMBODIMENTS

As FIG. 1 shows, the cooking vessel 10 may be moved on the hot plate 14 between left-edge and right-edge positions which are determined by the bottom 11 of vessel 10 resting against a rim 13 extending around hot plate 14. Therefore, the radiation pick-up StE in one case is at a minimum distance "a" from the side of vessel 10, sketched in solid lines, and in the other case is at a maximum distance "b" from the side of vessel 10, sketched in dotted lines.

The alignment and direction of the radiation detecting field 17 is critical in this set-up. It is clear that radiation pick-up StE is not significantly affected by spurious radiation from the hot plate 14 with cooking vessel 10 positioned at distance "a." Therefore, the error in measurement by virtue of spurious radiation from hot plate 14 is very small in this case, in fact, practically negligible. However, with cooking vessel 10' positioned at distance "b," an area of the hot plate 14 toward radiation pick-up StE lies exposed beyond bottom 11' of the vessel. In this situation, a considerable amount of spurious radiation from hot plate 14 reaches radiation pick-up StE and influences temperature sensing to a higher temperature.

In order to eliminate the sensing error caused by the change in position of cooking vessel 10 on hot plate 14, the apparatus provides a radiation measurement field 17 of radiation pick-up StE which has an adjustable radiation angle and size of the area 18/21 of radiation detection. In this case, radiation measurement field 17 is round in cross-section and it is tapered, that is, it expands continuously from the side of vessel 10 to radiation pick-up StE, depending on the extent of such distance. Such tapering is illustrated best in FIG. 3. For commercially available cooking vessels and hot plates, as well as economical radiation pick-ups, the angle of such taper may be a few degrees, for example, about 5 degrees.

By moving sensor S of radiation pick-up StE with respect to a prepositioned optical lens L, for example, a focusing lens, such radiation angle can be changed. Such movement of sensor S takes place along the middle axis 16 of radiation measurement field 17 behind lens L and is carried out when cooking vessel 10' is at its greatest distance "b" from radiation pick-up StE. When the cooking vessel is in the position of smallest distance "a," radiation pick-up StE is adjusted vertically with respect to the placement surface of hot plate 14, and the measurement is balanced at radiation pick-up StE so that, for the entire range of positions from "a" to "b," at constant temperature of the substance in cooking vessel 10/10', radiation pick-up StE gives a reading corresponding to the temperature. Thus, measuring errors caused by spurious radiation from hot plate 14 are eliminated in the case of a leveled-out heating system.

In addition, as FIG. 1 illustrates, the middle axis of radiation measurement field is at an acute angle of more than 0 and less than about 5 degrees with respect to the horizontal placement surface of the hot plate 14. This means that the central point 19/20 of area 18/21 of detected radiation on the side of vessel 10/10' moves farther up the side of the vessel with increasing distance between radiation pick-up StE and the side of vessel 10/10'. Thus, even during the heating-up phase errors in temperature changes caused by the position of cooking vessel 10/10' on hot plate 14 are substantially eliminated. FIG. 2 designates by "x" and "y" the distances of center points 19 and 20 from the placement surface of hot plate 14.

Areas of detected radiation 18 and 21 are practically the same size in the illustrated embodiment, but they take on an elliptical shape because of the incline of middle axis 16 of radiation measurement field 17. In situations in which radiation measurement field 17 is tapered, the area of radiation detection 21 is smaller than the area of radiation detection 18. With the tapering of field 17 to an angle, the size of area of radiation detection 21, and thus the signal received by radiation pick-up StE, can be changed and adjusted to the value which appears when cooking vessel 10 is placed at the center of hot plate 14.

Vessel 10 is encircled by an annular band 15 which has a uniform emission factor and is wide enough for the maximum area of radiation detection, considering the distance from "a" to "b" and the angle of incline of middle axis 16 of radiation measurement field 17. Band 15 is preferably located in the transition zone between the bottom and the side of cooking vessel 10, since it is particularly in this zone that the temperature of the side of the vessel corresponds to the temperature of the substance in the vessel, even during the heating-up phase.

To compensate for spurious radiation as provided with this invention, the radiation measurement field is changed with a simple radiation pick-up in such a way that the area of radiation detection no longer increases quadratically with increasing distance between the radiation pick-up and the side of the cooking vessel. The reduction in radiation sensed by reduction of the area of radiation detection area compensates for the additional spurious radiation, so that the radiation pick-up readings are substantially constant for constant temperatures, regardless of the position of the cooking vessel on the hot plate.

While the principles of this invention have been described in connection with specific embodiments, it should be understood clearly that these descriptions are made only by way of example and are not intended to limit the scope of the invention.

We claim:

1. In a method for measurement of the temperature of the contents of a filled vessel on a hot plate, of the type including sensing the extent of radiated heat by means of a remote radiation pick-up which is pointed toward and positioned at varying distances from the side of the vessel, said pick-up receiving radiation from a radiation measurement field extending at an angle of taper from said vessel side to said pick-up, and giving a signal corresponding to radiation received from an area on the side of the vessel, in situations in which varying placements of the vessel on the hot plate causes varying extents of spurious radiation available for sensing, the improvement comprising providing a radiation pick-up having a sensor and a lens, adjustably setting the angle of taper of the radiation measurement field to an angle diverging from said vessel side to said pick-up, said setting of said angle of taper being by moving the position of said sensor with respect to the position of said lens interposed between said pick-up and said vessel, said setting of said angle of taper thereby adjusting the magnitude of the area from which radiation is detected.

2. The method of claim 1 wherein the radiation measurement field has a substantially round cross-section and is tapered at an angle of less than about 5 degrees.

3. The method of claim 2 including the further step of adjusting the included angle between the middle axis of said radiation measurement field and the plane defined by the horizontal placement surface of the hot plate, said adjustment thereby changing the location of said area upon the side of said vessel.

4. The method of claim 1 wherein the side of said vessel has an exterior encircling band with a high emission factor, said band being of sufficient width to permit the projection thereon of a radiation measurement field as said vessel is moved between two extremes of position upon said hot plate, said band being disposed generally above a horizontal axis projected from the centerpoint of said lens.

5. The method of claim 4 wherein said band has a uniformly high emission factor of greater than about 0.9.

6. The method of claim 4 wherein said step of adjusting said included angle is performed when said vessel is in its position closest to that of said pick-up and wherein said setting of said angle of taper is performed when said vessel is at its maximum distance from said pick-up.

7. A method for measuring the temperature of the contents of a filled vessel including:
   providing a hot plate;
   providing a vessel with contents to be heated by said hot plate, said vessel being positionally moveable about the surface thereof, said vessel including an exterior encircling band having a high heat emission factor;
   providing a heat detecting pick-up, said pick-up including a sensor and a lens in a spaced relationship, said sensor being of the point type, said sensor and the center line of said lens defining a middle axis of a radiation measurement field;
   adjustably moving said sensor along said middle axis when said vessel is at its greatest distance from said pick-up, said movement being as required to cause said pick-up to generate a temperature reading which is generally equal to the actual temperature of said contents of said vessel;
   adjusting the angle included between said middle axis and the plane defined by the surface of said hot plate, said adjustment being performed when said vessel is in a position of closest proximity to said pick-up.

8. The method of claim 7 wherein said adjustment of said included angle is performed in a manner to cause the temperature indicated by said pick-up to be generally equal to the actual temperature of the contents of the vessel.

* * * * *

UNITED STATES PATENT AND TRADEMARK OFFICE
CERTIFICATE OF CORRECTION

PATENT NO. : 4,900,161

DATED : February 13, 1990

INVENTOR(S) : Kurt Wolf and Wolfram Andre

It is certified that error appears in the above-identified patent and that said Letters Patent is hereby corrected as shown below:

On the title page, item [57]:

In the Abstract, line 12, change "form" to --from--.

In the Abstract, line 16, change "detetion" to --detection--.
In the same line, change "vesel" to --vessel--.

Signed and Sealed this

Fifteenth Day of January, 1991

Attest:

HARRY F. MANBECK, JR.

*Attesting Officer*        *Commissioner of Patents and Trademarks*